March 4, 1924. Re. 15,783
J. A. S. HAMMOND
PROCESS OF DEHYDRATING ORGANIC LIQUIDS
Original Filed Dec. 29, 1921
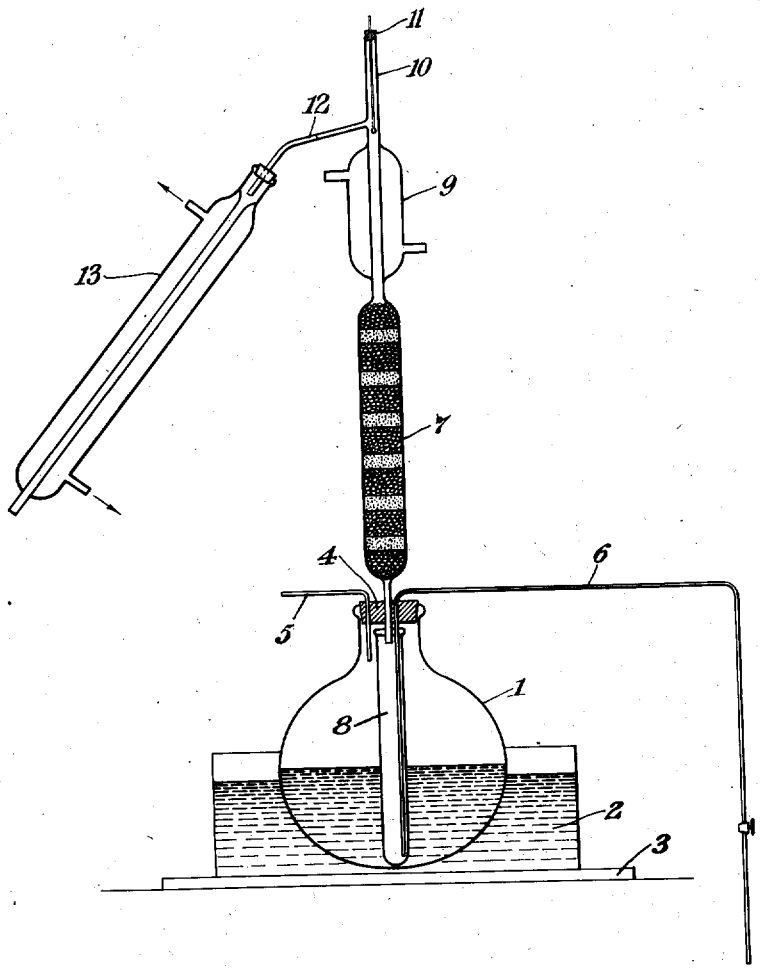
INVENTOR
John A. S. Hammond,
BY
Prindle, Wright, Neal & Beau.
ATTORNEYS Reissued Mar. 4, 1924. Re. 15,783

UNITED STATES PATENT OFFICE.

JOHN A. S. HAMMOND, OF WOODLAWN, MARYLAND, ASSIGNOR TO U. S. INDUSTRIAL ALCOHOL CO., A CORPORATION OF WEST VIRGINIA.

PROCESS OF DEHYDRATING ORGANIC LIQUIDS.

Original No. 1,466,435, dated August 28, 1923, Serial No. 525,797, filed December 29, 1921. Application for reissue filed December 15, 1923. Serial No. 680,916.

*To all whom it may concern:*

Be it known that I, JOHN A. S. HAMMOND, a citizen of the United States, a resident of Woodlawn, in the county of Baltimore and State of Maryland, have invented a certain new and useful Process of Dehydrating Organic Liquids, of which the following is a specification.

This invention relates to a process of dehydrating organic liquids and more particularly to a process of dehydrating ethyl ether.

In dehydrating many organic liquids by the use of the known dehydrating agents, difficulties have been encountered in securing a substantially complete dehydration. Where it has been endeavored to achieve the latter by means of the simple addition of a dehydrating agent to the liquid, it has been found that all of the water could not be wholly abstracted, and where a separation by distillation from the dehydrating agent has been tried, it has been found that the water accompanies the organic liquid owing either to the closeness of their boiling points or to the formation of constant boiling mixtures.

The invention has as an object the avoidance of the above mentioned difficulties in the case of distillation by preventing the formation, as far as possible, of constant boiling mixtures, and avoiding the simultaneous distillation of water and organic liquid. It has also as an object a dehydration and purification by a reagent which is inexpensive and easy to handle.

A still further object is to thoroughly dehydrate organic liquids of various kinds so as to remove the last traces of water.

These objects are in part accomplished by the use of a dehydrating agent in sufficient quantities to effect dehydration and to at all times provide anhydrous portions to contact with the vapors or liquids just prior to their exit from the apparatus. These objects are furthermore accomplished by the use of a dehydrating agent in a distillation process in such a manner as to remove it from contact with the organic liquid after it has absorbed quantities of water so that the latter will not be able to again become admixed with the organic liquid and form constant boiling mixtures or redistill therewith.

As a specific embodiment the dehydration of ethyl ether will be described in connection with the accompanying drawing which is of course adapted for use with other organic liquids.

In the drawing is shown an apparatus for distilling an organic liquid through a column containing sodium hydroxide and thereafter condensing it.

A flask 1 is shown immersed in a liquid or water bath 2 placed on a hot plate 3, and this flask is closed with a stopper 4 provided with three holes, one for the insertion of an inlet tube 5, another for a siphon tube 6, and the third for the end of a column 7. Within the flask is a test tube 8 positioned to receive the siphon tube 6 and to catch liquid falling from the column 7. The latter is filled with glass beads and pieces of sodium hydroxide in alternate layers. A condenser 9 surrounds the exit tube 10 leading from the top of the column and a thermometer 11 is inserted in the tube 10 to indicate the distillation temperatures. A branch tube 12 leads to a condenser 13 which is cooled by water or other cooling fluid in the usual way.

Ethyl ether is admitted through the tube 5 to the flask 1 and distilled so that its vapors ascend in the column 7 and come into contact with the successive layers of sodium hydroxide, with the result that they pass out to the condenser completely dehydrated. The sodium hydroxide absorbs the water and ultimately forms a solution therewith which descends into the test tube 8 and is siphoned off as desired through the tube 6. A large excess of sodium hydroxide is always maintained so that the ether vapors will at some point in the column have to contact with solid sodium hydroxide in substantially anhydrous condition. The upper layer of the latter will of course remain the driest and should be so maintained.

In this manner the ether as it loses its water is not continually kept in admixture with an aqueous dehydrating agent and therefore no constant boiling mixtures can be formed with water once removed nor can this water again be distilled with the ether in any form. The water is removed from further contact with the ether and the process may proceed to a complete dehydration.

The accomplishment of this object by this practical process makes it possible to market an ether free from water, and incidentally, free from other impurities. Ether is a substance which tenaciously clings to water, even resisting the most powerful dehydrating agents as long as it has an opportunity for establishing a state of equilibrium with them and the water, but when this state is continually upset by progressive removal of the water, the ether is gradually deprived of the last aqueous portions. The dehydration may proceed to about .01% water. The presence of water in ether in amounts as low as a fraction of 1% causes the formation in the course of standing of other impurities which constitute a serious objection where the ether is to be used for producing anæsthesia. The value of the above process is therefore apparent in view of the resistance which ether manifests to ordinary methods of dehydration.

Other ethers may be dehydrated by this process such as propyl, ethyl propyl and butyl ethers, and others. Various ketones may also be dehydrated, for example, diethyl ketone and methyl ethyl ketone. Alcohol may be dehydrated in this way and hydrocarbons, either aliphatic or aromatic may be dehydrated by this process. In fact, any organic liquid containing water and having a boiling point below the boiling point of water, or forming constant boiling mixtures therewith having boiling points below that of water, and which are not decomposed by the dehydrating agent, may be treated by the process of this invention.

The process may be continuously operated by admitting the ether or other liquid in tube 5 at approximately the same rate as it is distilled away in the flask 1.

Other dehydrating agents may be used as potassium hydroxide or other alkali hydroxide soluble in water, alkali oxides soluble in water, alkali carbonates soluble in water, metallic sodium, phosphorus pentoxide, many other solid acid anhydrides soluble in water, calcium chloride, sodium chloride, copper sulphate, and anhydrous sodium sulphate.

As many apparently widely different embodiments of this invention may be made without departing from the spirit thereof, it is to be understood that I do not intend to limit myself to the specific embodiment thereof except as indicated in the appended claims.

I claim:

1. The process of dehydrating organic liquids whose boiling points, and the boiling points of their constant boiling mixtures with water, are less than that of water, comprising distilling them and passing their vapors in contact with a dehydrating agent in such a manner that the vapors are finally exposed to substantially anhydrous portions of the dehydrating agent to accomplish dehydration.

2. The process of dehydrating ethers whose boiling points, and the boiling points of their constant boiling mixtures with water, are less than that of water, comprising distilling them and passing their vapors in contact with a dehydrating agent in such a manner that the vapors are finally exposed to substantially anhydrous portions of the dehydrating agent to accomplish dehydration.

3. The process of dehydrating ethers whose boiling points, and the boiling points of their constant boiling mixtures with water, are less than that of water, comprising distilling them and passing their vapors in contact with sodium hydroxide in such a manner that the vapors are finally exposed to substantially anhydrous portions of the sodium hydroxide to accomplish dehydration.

4. The process of dehydrating an organic liquid comprising treating it with a dehydrating agent to remove most of the water contained therein, and thereafter giving it a final treatment with a sufficient quantity of a strictly anhydrous dehydrating agent to remove the last traces of water.

5. The process of dehydrating organic liquids whose boiling points, and the boiling points of their constant boiling mixtures with water, are less than that of water, comprising distilling them and passing their vapors in contact with a dehydrating agent in such a manner that portions which deliquesce are removed from contact with the organic liquids and vapors, and the vapors are finally exposed to substantially anhydrous portions of the dehydrating agent to accomplish dehydration.

6. The process of dehydrating ethers whose boiling points and the boiling points of their constant boiling mixtures with water, are less than that of water, comprising distilling them and passing their vapors in contact with a dehydrating agent in such a manner that portions which deliquesce are removed from contact with the ethereal liquids and vapors, and the vapors are finally exposed to substantially anhydrous portions of the dehydrating agent to accomplish dehydration.

7. The process of dehydrating ethers whose boiling points, and the boiling points of their constant boiling mixtures with water, are less than that of water, comprising distilling them and passing their vapors in contact with sodium hydroxide in such a manner that portions which deliquesce are removed from contact with the ethereal liquids and vapors, and the vapors are finally exposed to substantially anhydrous portions of the sodium hydroxide to accomplish dehydration.

8. The process of dehydrating ethyl ether comprising distilling it and passing the vapors in contact with sodium hydroxide in such a manner that portions which deliquesce are removed from contact with the ether liquid and vapors, and the vapors are finally exposed to substantially anhydrous portions of the hydroxide to accomplish dehydration.

9. The process of dehydrating organic liquids whose boiling points, and the boiling points of their constant boiling mixtures with water, are less than that of water, comprising distilling them and passing their vapors in contact with a dehydrating agent in such a manner that portions which deliquesce are removed from contact with the organic liquids and vapors.

10. The process of dehydrating ethers whose boiling points, and the boiling points of their constant boiling mixtures with water, are less than that of water, comprising distilling them and passing their vapors in contact with a dehydrating agent in such a manner that portions which deliquesce are removed from contact with the ethereal liquids and vapors.

11. The process of dehydrating ethyl ether comprising distilling it and passing the vapors in contact with sodium hydroxide in such a manner that portions which deliquesce are removed from contact with the ether liquid and vapors.

12. The process of dehydrating organic liquids whose boiling ponts, and the boiling points of their constant boiling mixtures with water, are less than that of water, comprising continuously distilling them and passing their vapors in contact with a dehydrating agent in such a manner that the vapors are finally exposed to substantially anhydrous portions of the dehydrating agent to accomplish dehydration.

13. The process of dehydrating ethyl ether comprising continuously distilling it and passing the vapors in contact with sodium hydroxide in such a manner that portions which deliquesce are removed from contact with the ether liquid and vapors, and the vapors are finally exposed to substantially anhydrous portions of the hydroxide to accomplish dehydration.

JOHN A. S. HAMMOND.